July 21, 1953  H. C. SCHUTT  2,646,133
METHOD AND APPARATUS FOR SEPARATING FLUIDS
Filed July 3, 1948  4 Sheets-Sheet 2

INVENTOR
HERMANN C. SCHUTT
BY
ATTORNEYS

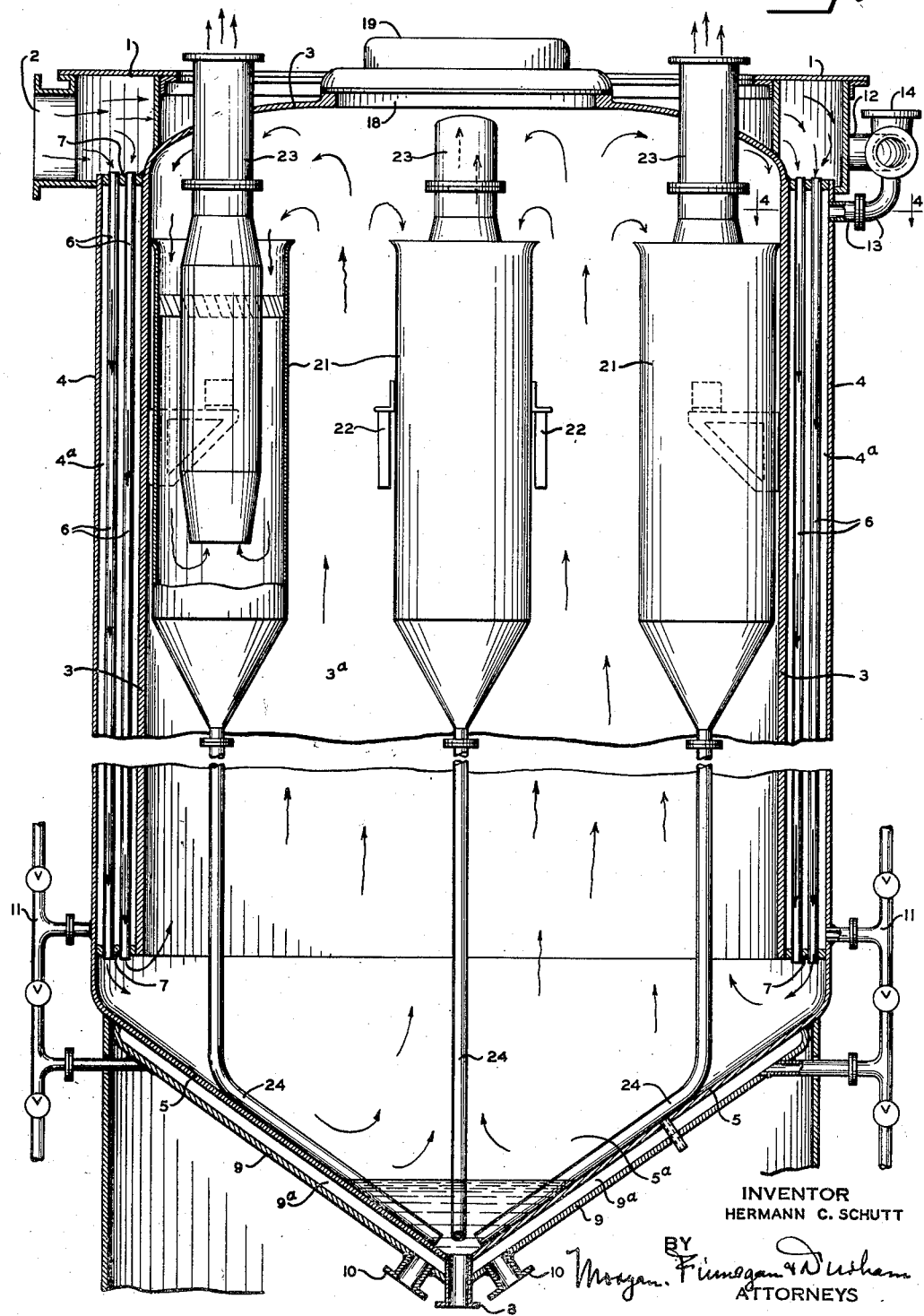

July 21, 1953 H. C. SCHUTT 2,646,133
METHOD AND APPARATUS FOR SEPARATING FLUIDS
Filed July 3, 1948 4 Sheets-Sheet 4

INVENTOR
HERMAN C. SCHUTT
BY
ATTORNEYS

Patented July 21, 1953

2,646,133

UNITED STATES PATENT OFFICE

2,646,133

METHOD AND APPARATUS FOR SEPARATING FLUIDS

Hermann C. Schutt, Framingham Center, Mass., assignor to Stone & Webster Engineering Corporation, Boston, Mass., a corporation of Massachusetts Application July 3, 1948, Serial No. 36,917

15 Claims. (Cl. 183—32)

This invention relates to processes of and apparatus for treating a gaseous or vaporous medium containing a substance or substances liquefiable under the operating conditions with the object in view of condensing, agglomerating and separating the liquefiable substance or substances from the gaseous or vaporous medium and relates more particularly to processes of and apparatus for the accomplishment of these ends through the application to the gaseous or vaporous medium of vibrational motion and energy as produced by sound waves.

Objects and advantages of the invention will be set forth in part hereinafter and in part will be obvious herefrom, or may be learned by practice with the invention, the same being realized and attained by means of the steps, processes, instrumentalities and combinations pointed out in the appended claims.

The invention consists in the steps, processes, novel parts, constructions, arrangements, combinations and improvements herein shown and described.

The accompanying drawings, referred to herein, and constituting a part hereof, illustrate embodiments of apparatus for carrying out the process of the invention, and together with the description, serve to explain the principles of the invention.

It is known to subject a gas or vaporous body containing one or more substances liquefiable under the operating conditions, to cooling whereby the substance in whole or in part will appear in the form of suspended liquid particles, commonly termed "fog" or "mist." This fog or mist may be subjected to an electrostatic field with the object of obtaining genuine liquid phase of the material and separation of the substance by suitable apparatus. Apparatus for this latter purpose is typified by the well-known Cottrell precipitator. Or, the fog-carrying body may be subjected to centrifugal separation as by means of the well-known cyclone separator. Alternatively, the fog-carrying body may be subjected to scrubbing with a liquid with the same object of separation in view. These methods and means are not applicable in all cases, are frequently inefficient from a standpoint of liquid recovery, and the cyclone separation is applicable only where the particles are of sufficient mass so that they can be propelled against the walls of the cyclone separator during the relatively short time in which the fog-carrying body passes through the apparatus.

An object of this invention is to enable the obtainment of a higher product recovery in the condensing, agglomerating and separating of the liquefiable component in a gaseous or vaporous medium than is possible by any other known or applied means, through the provision of a novel and improved condensing, agglomerating and separating method and apparatus employing acoustic vibrational energy.

Another object of this invention is to obtain, through the employment of sonic energy, higher rates of heat transfer and condensation, thus reducing the heat transfer area which would normally be required for cooling a gas body with relatively low concentration of liquefiable material.

Of the drawings:

Fig. 3 is a view in broken section to the scale of Fig. 2 taken along the line 3—3 of Fig. 2 and showing details of the construction of the embodiment of Fig. 1; certain internal and external structure being shown in elevation for clarity;

Figure 1:
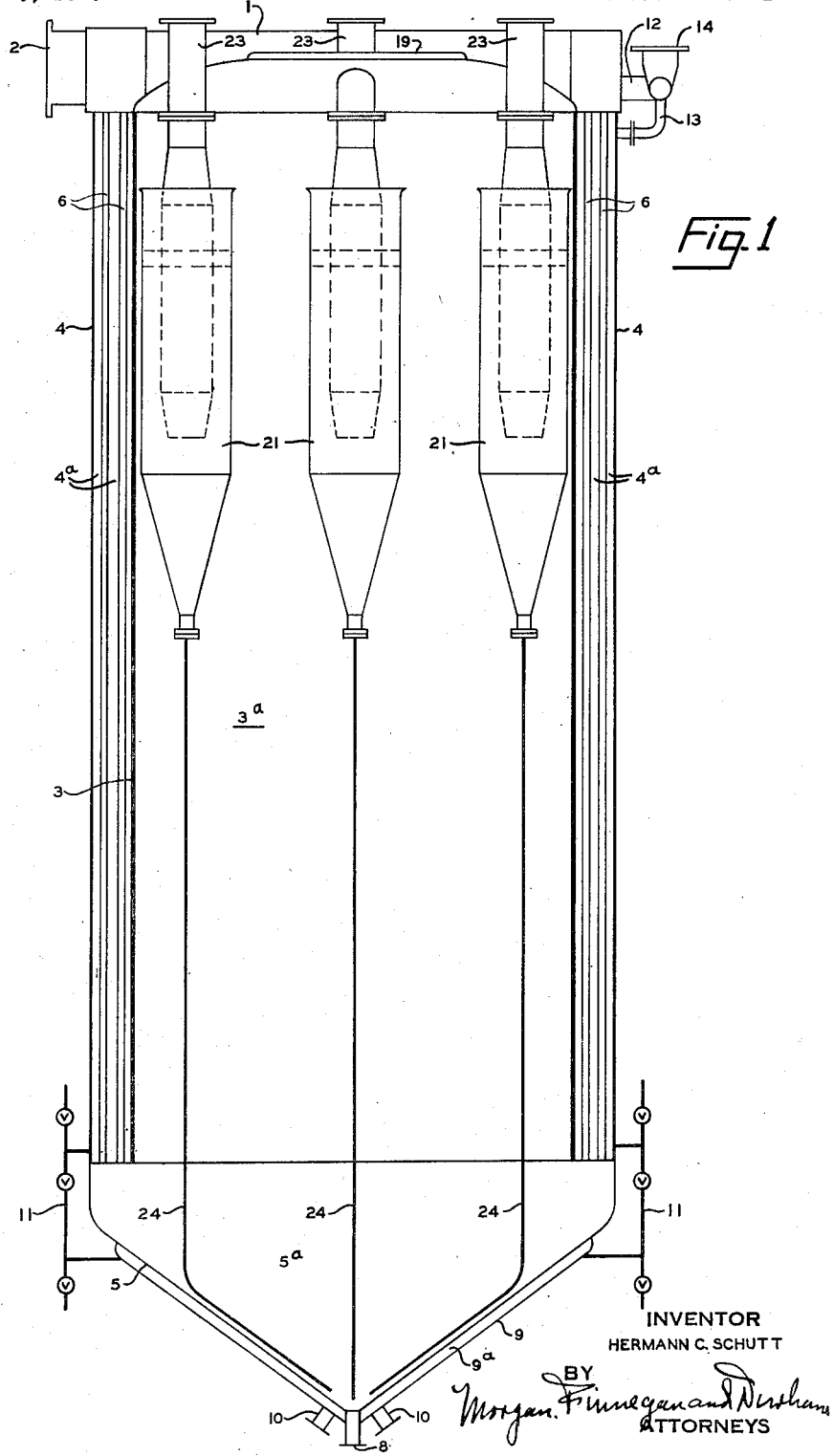
Fig. 1 is a semi-schematic view in section of a typical and illustrative embodiment of condenser-agglomerator-separator apparatus in accordance with this invention, the view being taken along a plane containing its vertical axis and corresponding to a view taken along the line 3—3 of Fig. 2; certain of the internal structure being shown in elevation for clarity.

In accordance with the embodiment of condenser-agglomerator-separator apparatus in accordance with this invention as depicted in Figs. 1–4, inc., an inverted inner vessel 3 is telescopically received within an upright outer vessel 4. The latter is annularly spaced from the former to provide therebetween an annular space 4a adapted to be supplied with coolant and provided with a bank of cooling and condensing tubes 6.

A continuous header 1, preferably annular, provided with an inlet nozzle 2, is disposed adjacent the top of the vessel 3 and is secured thereto in part and in part to the vessel 4. Flowing gas and/or vapor containing the liquefiable substance or substances to be separated is adapted to enter the header 1 through the nozzle 2 and is distributed by the header 1 to the individual cooling tubes 6 at the top of the latter for passage therethrough in indirect heat exchange with coolant supplied to the chamber 4a.

The vessel 3 is open at the bottom and is closed at the top, except for a central opening 18 through which sonic energy is adapted to be supplied to the interior of the vessel by means of suitable sonic energy generating means 19. The vessel 3, together with the outer vessel 4, which is closed at the bottom, provides an agglomerating chamber 3a in which suspended liquid particles of the gas or vapor discharged thereinto from the cooling and condensing tubes 6, are to be agglomerated into larger particles or droplets by the application of sonic energy thereto through the opening 18. Both the vessel 3 and vessel 4 are preferably of cylindrical contour and concentric with each other and with the header 1. The outer vessel, or jacket, 4 extends beyond the bottom of the vessel 3 and terminates in a closure or collecting section 5, preferably of conical or substantially conical configuration, generally underlying the concentric chambers 3a and 4a and providing a bottom section 5a of the agglomerating chamber 3a.

Figure 4:
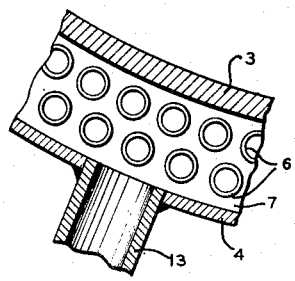
Fig. 4 is a fragmentary view in section and to a still larger scale of a detail of Fig. 3 taken along the line 4—4 of Fig. 3; and, Fig. 5 is a fragmentary view in vertical section with parts in elevation of apparatus in accordance with this invention, the view showing a modified and generally preferred form of centrifugal separating apparatus in accordance with this invention.

The cooling and condensing tubes 6 are disposed in suitable number in the coolant chamber 4a, these tubes preferably being grouped in a suitable number of preferably concentric, circular and preferably angularly offset rows, as best depicted in Fig. 4, wherein two such rows are shown. Each such tube opens at its top into the interior of the header 1 and, at its bottom, into the bottom section 5a of the agglomerating chamber 3a, whereby gas or vapor entering the tubes 6 at the top from the header 1 will flow downward in a plurality of parallel streams and enter the bottom section 5a of the agglomerating chamber. Annular tube sheets 7 at the top and bottom, respectively, of the coolant chamber 4a form separate closures between the vessel 3 and its jacket 4 and serve to seal the ends of the chamber and to fix the tubes 6 in desired parallel alignment therein.

The collecting section 5 is provided with a drainage or outlet nozzle 8 at its apex and is preferably jacketed exteriorly over substantially all of its area by means of a jacket member 9 circumferentially spaced therefrom so as to form therewith an annular chamber 9a to which a suitable heating or cooling medium is adapted to be supplied at the bottom through one or more inlet nozzles 10. Means, such as the valved pipe connections 11, preferably external, are provided in suitable number between the top of the chamber 9a and the bottom of the coolant chamber 4a for transferring from the former to the latter coolant, these connections preferably being evenly distributed around the circumference of the apparatus. Alternatively, in accordance with this invention, coolant may be supplied through the valved connections 11 directly to the chamber 4a at its bottom without flowing through the chamber 9a. The latter, in such case, may be supplied separately with coolant, or, if desired, with a suitable heating medium for maintaining liquid accumulated in 5a at a desired temperature or condition of fluidity. In such case, the heating medium may be discharged separately through the valved connections 11 by suitable manipulation of the valves shown, as will be apparent to those skilled in the art.

A header 12, through which coolant is adapted to be discharged from the coolant chamber 4a, is disposed radially outwardly of the header 1 at the top of the vessel 3. The header 12 is connected with the coolant chamber 4a adjacent its top, by means of pipe connections 13 in suitable number which are preferably distributed evenly around the circumference of the jacket 4. By way of example, a typical embodiment of the apparatus of this invention may have sixteen of the inlet connections 11 to effect good distribution of coolant to the chamber 4a, and eight of the outlet connections 13, the latter being preferably of larger diameter. A discharge nozzle 14 is provided on the outlet header 12 for discharging the cooling medium therefrom, and the pipe connections 13 serve fixedly to support the header 12 from the inlet header 1. The coolant flows upward through the chamber 4a, countercurrent to the down-flowing gas or vapor in the tubes 6, to the points of egress at the top.

The acoustic energy generating means 19 is or are of a type and capacity so as in operation to emit and direct acoustic waves of the proper intensity and frequency downward into the agglomerating chamber 3a and into the path of the previously cooled gas or vapor stream, with its content of "fog" or "mist," which in operation rises therein. The resultant vibrational motion imparted to the rising gas and/or vapor stream serves to agglomerate and/or coalesce the liquid fog particles to a larger size centrifugally separable from the gas or vapor stream carrying the same. The embodied generating means may be strictly mechanical such, for example, as a siren type apparatus; or it may be electromechanical such as a magneto-striction type vibrator; or, it may be strictly electrical such, for example, as a piezo-electric crystal and cathode ray tube apparatus, and may comprise single or multiple units as required to develop the necessary acoustic energy. The siren type apparatus has a high capacity for generating acoustic energy at a wide range of vibrational frequency preferably of from about 1 to about 10 kilocycles.

Figure 2:
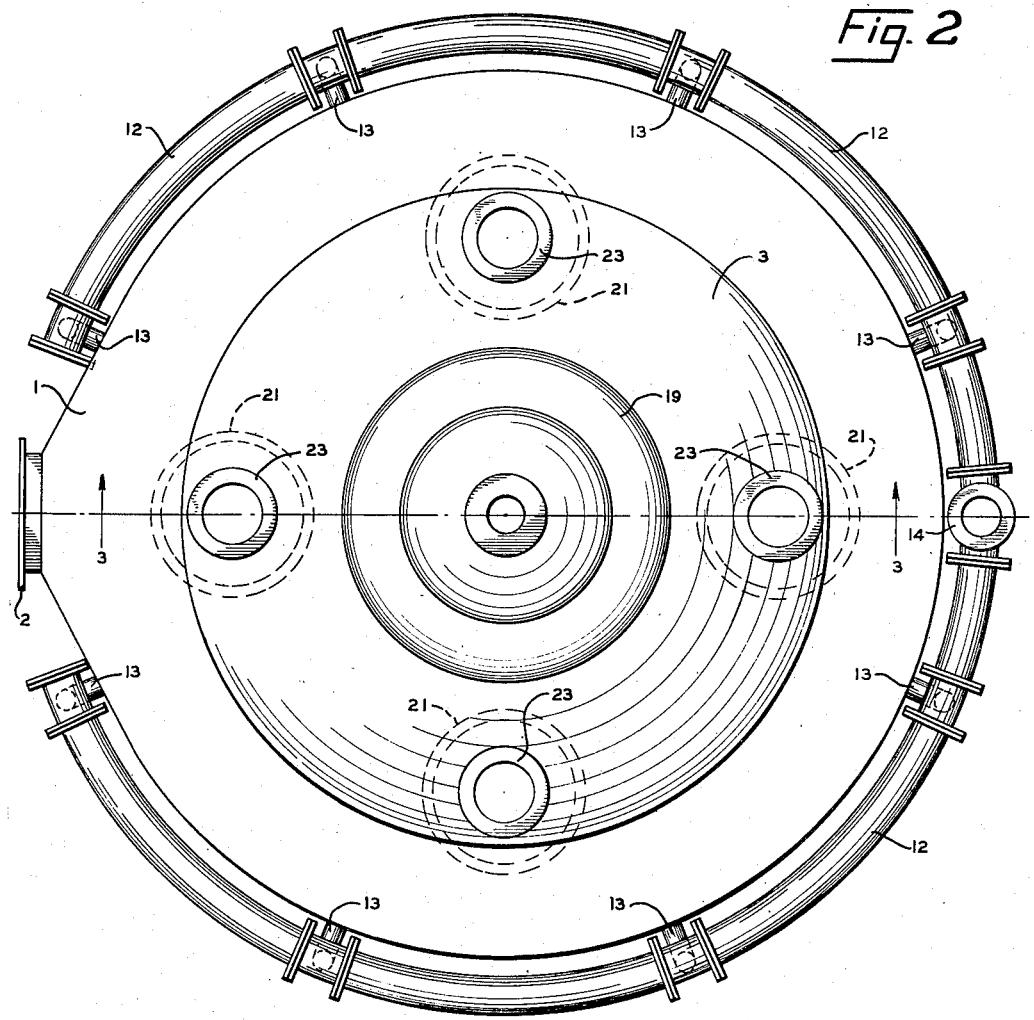
Fig. 2 is a view in top plan and to an enlarged scale of the embodiment of Fig. 1.

Means are provided adjacent the top of the agglomerating chamber 3a for separating the agglomerated droplets from the carrier medium. The separating means, as embodied, comprises one or more centrifugal separating units of practically any acceptable, conventional design. In accordance with the embodiment depicted in Fig. 3, a set of conventional cyclone separators 21 is located in the chamber 3a near its top, the separators being disposed around the opening 18 so as to be outside of the direct propagation path of the acoustic energy waves emitted by the generating means 19. Four such separators are shown in Fig. 2 disposed vertically and preferably symmetrically in the chamber in a circular row concentric with the vessel 3. Each separator is suitably fixedly supported within the chamber 3a as, for example, by means of the supporting brackets 22 for the purpose provided. Each separator is provided at its top with a separate vapor outlet duct or nozzle 23 through which the gas or vapor carrier medium free of its content of liquefiable substance is lead through the closed top of the vessel 3, the separate nozzles being adapted to discharge into a common header (not shown).

Drain or run-down pipes 24 lead, one from the bottom of each separator 21, downwardly into the collecting section 5a and terminate each adjacent the apex so that the end of each will lie below the normal level of liquid accumulated in the section 5a in normal operation and thus be sealed against the flow of the carrier gas or vapor up into the separators 21.

In the carrying out of the process of this invention using the embodiment of Fig. 1 for the separation of a liquefiable component from a gaseous or vaporous fluid serving as the carrier therefor, the latter enters the distributing header 1 through the nozzle 2, flows down through the cooling and condensing tubes 6 in a plurality of parallel streams and enters the agglomerating chamber 3a just above the collecting section 5.

Assuming the valved connections have been suitably adjusted for series flow of coolant from chamber 9a to chamber 4a, a cooling medium, water or other suitable liquid, is supplied to the chamber 9a through the nozzles 10, flows upwardly through the chamber 9a, thence upwardly through the coolant chamber 4a containing the cooling and condensing tubes 6 and countercurrent to the fluid in the tubes, and is discharged via the connections 13 and header 12 through the nozzle 14. Heat is absorbed by the cooling medium both from liquid accumulated in the section 5a and from the gaseous fluid in the tubes 6 thereby to effect condensation of all or substantially all of its liquefiable component and, advantageously, to convert the coolant to steam. The heat absorbed by the cooling fluid may be recovered as desired and close control over the tube wall temperature and condensate film temperature in the tubes may be exercised to maintain a desired intermediate film, or fluidity of liquid condensate, in the tubes 6. In the case where the gas contains a sulphur mist or fog as the liquefiable component, this ability to maintain close control of tube wall temperature and film temperature is of utmost importance in order to maintain the liquid sulphur condensate on the tube walls in an optimum state of fluidity.

The condensate formed in the tubes 6 flows downwardly into, and is accumulated in, the collecting section 5a from which it may be continuously withdrawn through the nozzle 8 at a rate suitable to maintain any selected level of liquid in the chamber 5a, for which purpose any suitable form of liquid level control apparatus (not shown) may be employed.

The gaseous fluid issuing from the tubes 6 is laden with fog and flows in the agglomerating chamber 3a in a direction from the bottom of the chamber upwardly therein through the direct propagation path of the acoustic energy waves of proper intensity emitted downwardly through the opening 18 from the acoustic energy generator means 19. The vibrational intensity is the highest at the top of the chamber where it is desired to be high to effect high frequency of collision of the small suspended liquid particles not yet agglomerated notwithstanding that the total number of liquid particles at the top of the chamber is far less than the total number of liquid particles at the bottom of the chamber. The walls 3 are preferably of heavy sheet steel construction and are jacketed with liquid, as in this case, to minimize energy dissipation through the wall. Part of the sonic vibrations are reflected and enter the cooling tubes 6 to effect an increase in the rate of the diffusional processes between the film and the flowing gaseous fluid in the tubes thus effecting greater cooling and accompanying greater condensation. Liquid droplets or particles resulting from this agglomeration in the chamber 3a whcih are too heavy to remain suspended in the rising gas stream descend into the collecting chamber 5a and merge with any liquid accumulated therein. Agglomerated liquid particles which remain suspended in the gaseous fluid rising through the chamber 3a are, at the chamber top, all or practically all in the form of droplets of sufficient mass to permit separation from the gaseous fluid by centrifugal separating means. The gaseous fluid containing these suspended particles or droplets of larger size enters the cyclone separators 21 and has imparted thereto in known manner, centrifugal motion operating readily to throw the remaining suspended droplets against the outer wall of the cyclone and thereby to effect the removal of substantially 100% of the remaining liquefiable component from the gaseous fluid. The liquid film moving down this outer wall of each separator is conducted by the respective pipes 24 out of contact with the rising gas stream in the chamber 3a, to the collecting section 5a where it joins any condensate previously formed. The gas stream, now stripped of its liquefiable component, discharges from the separators 21 through the discharge nozzle 23 of each.

Figure 5:
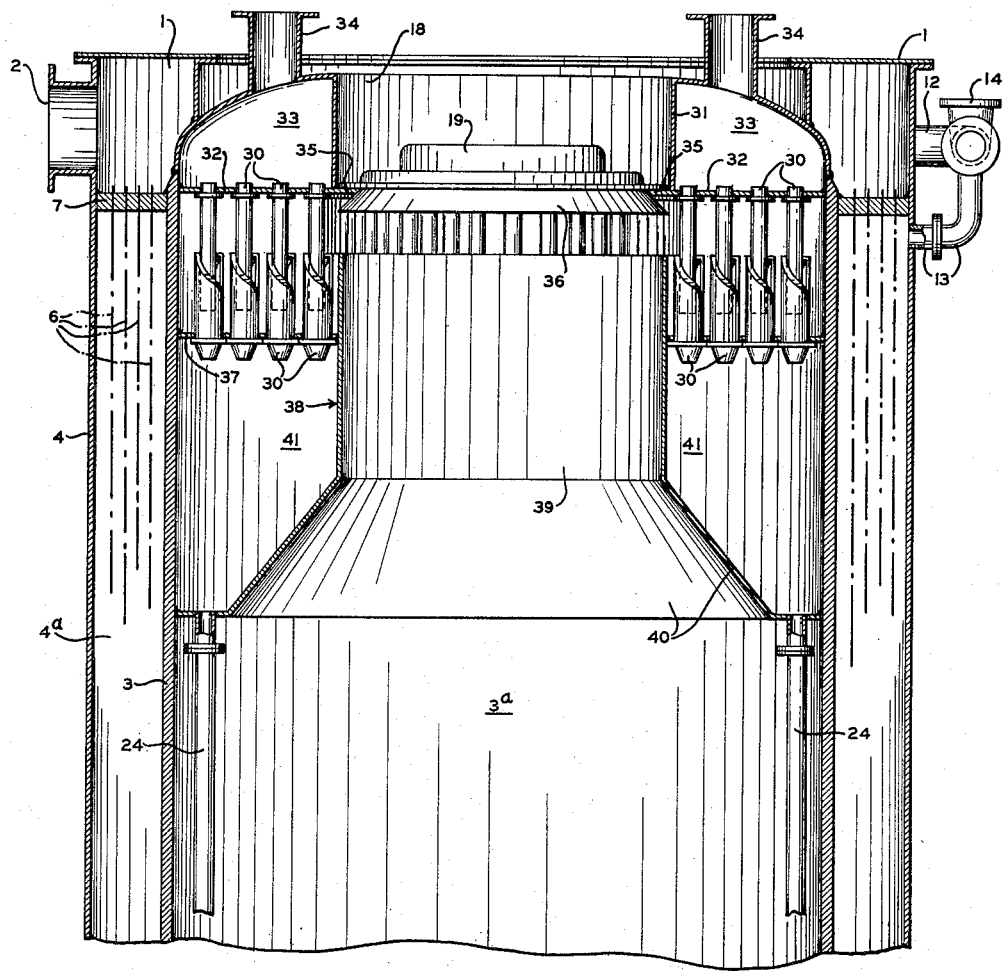

In the embodiment of this invention shown in Fig. 5, a relatively large number of small centrifugal separator units 30 of a conventional type are employed in lieu of a small number of large units such as the conventional cyclone units 21 depicted in Figs. 1–3. As here preferably embodied, the inner vessel 3 is provided with a vertical, cylindrical partition member 31 extending downwardly from the top of the vessel around the opening 18. The member 31 terminates at its lower end in sealing engagement with a horizontal, annular partition member 32, so as to form therewith and with the top of the vessel 3, an annular header chamber 33 adapted to receive the gaseous or vaporous effluent from the respective separator units 30. One or more discharge nozzles 34 are carried by the vessel 3 for discharging the chamber 33 to a common header (not shown). Two such nozzles are shown.

The partition member 32 is of annular shape providing a central opening and is preferably extended radially inwardly from the partition member 31 to provide a narrow annular bolting flange or shoulder 35 to which the sonic energy generating means 19 is secured over the central opening of the annular member 32, as by suitable fastening means not shown. Advantageously, an annular baffle member 36, which may be of frusto-conical shape as shown or of other suitable shape, is disposed in the central opening of the horizontal partition member 32 and serves to restrict undesired radial diffusion of the vibrational waves, immediately subjacent the opening.

The separator units 30 are each vertically disposed in the vessel 3, are preferably identical, and are arranged around the central opening of the partition member 32, in a series of circular rows each concentric with the vertical axis of the vessel and with each other. The units 30 in any given row are preferably uniformly circumferentially spaced on centers, but this spacing preferably increases from the inner row to the outer row, by an amount which is preferably uniform and effects even vapor distribution.

The units 30 are of conventional construction each comprising in general a pair of inner and outer tubes, respectively, each tube open at its ends, with the outer tube of a configuration at the upper end such as to impart a rotary centrifugal motion to fluid entering its upper end. The inner tube of each unit extends at its upper end through the plate 32 into the header chamber 33 and the outer tube of each unit extends at its lower end through an annular horizontal partition member 37, the members 32 and 37 at their junction with the tube walls being preferably in sealing engagement therewith. Fluid which enters the top opening of the outer tube of a unit will be set in rotation, thus to throw liquid particles contained in the fluid against the walls of the outer tube. The separated liquid flows by gravity out of the outer tube at its bottom whereas the fluid, freed of its liquid particles, flows upwardly through the inner tube into the header chamber 33.

Means are provided within the vessel 3 for preventing commingling of the liquid effluent from the separator units 30 with the gaseous or vaporous fluid flowing to the separator units, and for conducting the liquid effluent to the bottom of the vessel beneath the level of liquids accumulated therein, just as in the embodiment of Fig. 3. As here preferably embodied, a tubular baffle member 38 is provided with an upper portion 39 and a lower portion 40, the former of preferably cylindrical contour, extending from its junction with the latter at a suitable level below the units 30, upwardly through the central opening in the partition member 37 to a level advantageously at or just above the top of the outer tubes of the separator units 30. The lower portion 40 of the baffle member 38 is advantageously of frusto-conical shape and extends horizontally radially outwardly at its bottom into circumferential sealing engagement with the vessel 3 thereby to form an annular chamber 41 underlying the bank of the separators 30, for collecting dripping from the separators. Conduits 24 in suitable number serve to drain the liquid from the collecting chamber 41 to the bottom of the vessel 3 as in the embodiment of Figs. 1 and 3.

The baffle member 38, throughout its upper portion 39 in particular, serves additionally to confine the vibrational waves produced by the sonic energy generator means 19, to a restricted central path just prior to entrance of the gaseous or vaporous stream to the centrifugal separators 30 at the top of the vessel where the sonic energy intensity should be the highest to facilitate the agglomeration of the reduced number of small liquid particles in the rising gaseous or vaporous fluid in this section of the vessel.

Through the provision of the large number of small centrifugal separating units 30, a highly efficient separation of agglomerated liquid particles may be effected and a substantially complete separation of liquid particles in the gaseous or vaporous effluent of the vessel is attainable.

The invention in its broader aspects is not limited to the specific processes and steps shown and described but departures may be made therefrom within the scope of the accompanying claims without departing from the principles of the invention and without sacrificing its chief advantage.

What is claimed is:

1. Apparatus for separating a liquefiable component from a gaseous and/or vaporous material comprising: means forming a cooling chamber to be supplied with coolant; means forming an agglomerating chamber including an upper portion encased by said cooling member and a lower portion together providing an ascending path along which said material is adapted to flow, for agglomeration of its liquefiable component, said lower portion including a collecting section for liquid; means for flowing said material through said cooling chamber in heat exchange relation with coolant therein, into said lower portion for ascent along said path to said upper portion; means for generating acoustic energy vibrations of high intensity in said upper portion and for directing said waves along said path toward said lower portion to agglomerate the liquefiable component of said material; means in said upper portion generally outside of said path and of a direct propagation path of said waves for conducting said material flowing along said path, from said upper portion to the exterior of said agglomerating chamber and for separating the agglomerated liquid particles from said material in transit therethrough; and, means for conducting the separated liquid agglomerate in a confined stream from said separating means to a level in said collecting section below the level of liquid accumulated therein.

2. Apparatus as characterized by claim 1 including means for circulating a coolant through said coolant chamber counter-current to and in indirect heat exchange relation to said material as it flows therethrough.

3. Apparatus as characterized by claim 1 in which said collecting section is jacketed to provide a chamber thereabout to be supplied with a heat exchange medium.

4. Apparatus as characterized by claim 3 including means for circulating a coolant seriatim through said jacket chamber and said coolant chamber and in counter-current relation to said material as it flows through said coolant chamber.

5. Apparatus as characterized by claim 1 in which said means for flowing said material through said coolant chamber comprises separate substantially vertical and parallel fluid conduits in said chamber, said conduits having each its inlet at the top and its outlet at the bottom.

6. Apparatus as characterized by claim 5 in which said collecting section also underlies said fluid conduits.

7. Apparatus as characterized by claim 6 in which said collecting section has a substantially conical configuration and in which said means for conducting separated liquid from said separating means to said collecting section has a terminus substantially at the apex of said section.

8. Apparatus as characterized by claim 1 in which said energy generating means has a frequency range of from about 1 to about 10 kilocycles.

9. Apparatus as characterized by claim 1 in which said conducting-separating means in said upper portion comprises a number of centrifugal separators.

10. Apparatus as characterized by claim 9 in which said separators are disposed in a circle within said agglomerating chamber.

11. Apparatus as characterized by claim 1 in which said agglomerating chamber forming means comprises an upright vessel of cylindrical contour having a central opening in its top through which the acoustic energy waves are adapted to enter said chamber, and in which said conducting-separating means comprises a number of cyclone separators disposed around said opening.

12. Apparatus for separating a liquefiable component from a gaseous material comprising an elongated vessel having an open bottom, said vessel being adapted to be supported in use with its long axis vertical; a jacket annularly spaced from said vessel; a bank of tubes in the annular space, paralleling each other and the long axis of said vessel, said tubes having upper inlet ends and lower outlet ends and communicating at their outlet ends each with said vessel through its open bottom; means including a distributing header for supplying gaseous material to the inlet ends of said tubes; a closure and collecting section merging with said jacket; conduits for circulating coolant through said annular space; an acoustic energy generator and centrifugal separators at the upper end of said vessel, said separators being disposed generally circumferentially of said generator outside the direct path of propagation of energy waves emitted by said generator; and conduits for conducting gaseous separation products from said separators to the exterior of said vessel and separately conducting liquid separation products from said separators to said collecting section.

13. Apparatus as characterized by claim 12 in which said collecting section comprises an inclined surface portion facing the outlet ends of said tubes to reflect acoustic energy waves into the outlet end of said tubes.

14. Process for separating a liquefiable component from a gaseous material containing the same comprising causing the gaseous material to flow in a confined stream successively through a cooling and condensing zone, an agglomerating zone and a separating zone; subjecting the material in its passage through said cooling and condensing zone and said agglomerating zone to acoustic vibrational energy of progressively increasing intensity and collecting the resulting liquid phase portion of the liquefiable component; subjecting the gaseous material in said separating zone to separation to separate substantially the remainder of the liquefiable component from the gaseous material, combining the separated liquids and separately recovering the combined liquid and the liquid-free gas, as products.

15. Apparatus for separating a liquefiable component from a gaseous material containing the same comprising means for conducting the gaseous material in a confined stream successively through a cooling and condensing zone, an agglomerating zone and a gas-liquid separating zone; means for subjecting said treated stream to acoustic vibrational energy of high intensity in said agglomerating zone and to acoustic vibrational energy of lesser intensity in said cooling and condensing zone; means for separating agglomerated liquid particles from said stream in said separating zone; and, means for withdrawing liquid separated from said stream, from said zone.

HERMANN C. SCHUTT.

References Cited in the file of this patent

UNITED STATES PATENTS

| Number | Name | Date |
|---|---|---|
| 1,130,213 | Steere | Mar. 2, 1915 |
| 1,826,561 | Miller | Oct. 6, 1931 |
| 2,215,484 | St. Clair | Sept. 24, 1940 |
| 2,216,779 | Houghton et al. | Oct. 8, 1940 |
| 2,300,761 | Amy | Nov. 3, 1942 |